(12) United States Patent
Kolb et al.

(10) Patent No.: US 11,089,780 B2
(45) Date of Patent: Aug. 17, 2021

(54) PENDIMETHANLIN MICROCAPSULES WITH A SHELL MADE OF TETRAMETHYLXYLYLENE DIISOCYANATE AND A POLYAMINE WITH AT LEAST THREE AMINE GROUPS

(71) Applicant: BASF SE, Ludwigshafen (DE)

(72) Inventors: Klaus Kolb, Schifferstadt (DE); Wolfgang Gregori, Ludwigshafen (DE); Ulrich Steinbrenner, Neustadt (DE); Liliana Parra Rapado, Offenburg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/736,927

(22) PCT Filed: Jun. 8, 2016

(86) PCT No.: PCT/EP2016/062985
§ 371 (c)(1),
(2) Date: Dec. 15, 2017

(87) PCT Pub. No.: WO2016/202659
PCT Pub. Date: Dec. 22, 2016

(65) Prior Publication Data
US 2018/0360034 A1 Dec. 20, 2018

(30) Foreign Application Priority Data

Jun. 19, 2015 (EP) .................................. 15172817
Sep. 9, 2015 (EP) .................................. 15184367

(51) Int. Cl.
*A01N 33/18* (2006.01)
*A01N 25/28* (2006.01)

(52) U.S. Cl.
CPC ............. *A01N 33/18* (2013.01); *A01N 25/28* (2013.01)

(58) Field of Classification Search
CPC ......... A01N 33/18; A01N 25/28; A01N 25/30
See application file for complete search history.

(56) References Cited

U.S. PATENT DOCUMENTS

| 4,902,667 | A | 2/1990 | Whitecomb et al. | |
| 5,925,595 | A | 7/1999 | Seitz et al. | |
| 8,709,975 | B2 | 4/2014 | Cannan et al. | |
| 2003/0119675 | A1 | 6/2003 | Wolf et al. | |
| 2005/0277549 | A1 | 12/2005 | Seitz et al. | |
| 2007/0238615 | A1 | 10/2007 | Krause et al. | |
| 2008/0242548 | A1* | 10/2008 | Asrar ..................... | A01N 25/28 504/339 |
| 2009/0053271 | A1 | 2/2009 | Giner et al. | |
| 2010/0068299 | A1* | 3/2010 | van der Krieken .... | A01N 41/04 424/638 |
| 2011/0015072 | A1 | 1/2011 | Hechavarria Fonseca et al. | |
| 2012/0245027 | A1 | 9/2012 | Casaña Giner et al. | |
| 2013/0029847 | A1 | 1/2013 | Findley et al. | |
| 2014/0200141 | A1 | 7/2014 | Shroff et al. | |

FOREIGN PATENT DOCUMENTS

| WO | 2011095859 | 8/2011 |
| WO | 2015022634 | 2/2015 |
| WO | 2015071087 | 5/2015 |
| WO | 2015075167 | 5/2015 |
| WO | 2015144451 | 10/2015 |
| WO | 2015155236 | 10/2015 |
| WO | 2015158565 | 10/2015 |
| WO | 2015197392 | 12/2015 |
| WO | 2015197487 | 12/2015 |
| WO | 2016041693 | 3/2016 |
| WO | 2016062814 | 4/2016 |
| WO | 2016120355 | 8/2016 |
| WO | 2016128470 | 8/2016 |
| WO | 2016169683 | 10/2016 |
| WO | 16202659 A1 | 12/2016 |
| WO | 2016202500 | 12/2016 |
| WO | 2017029302 | 2/2017 |

OTHER PUBLICATIONS

Search Report, issued in EP Application No. 15172817.7, dated Aug. 10, 2015.
International Search Report, issued in PCT/EP2016/062985, dated Aug. 8, 2016.
International Preliminary Report on Patentability, issued in PCT/EP2016/062985, dated Dec. 19, 2017.
Office Action, issued in co-pending U.S. Appl. No. 15/737,020, dated Dec. 11, 2018.
Final Office Action, issued in co-pending U.S. Appl. No. 15/737,020, dated Apr. 24, 2019.
Inchem.org, alachlor, obtained online at: http://www.inchem.org/documents/icsc/eucs0371.htm (2010).

* cited by examiner

*Primary Examiner* — Ali Soroush
(74) *Attorney, Agent, or Firm* — Marshall, Gerstein & Borun LLP

(57) ABSTRACT

The present invention relates to a composition comprising microcapsules, which comprise a polyurea shell and a core, wherein the core comprises pendimethalin and the shell comprises a polymerization product of a tetramethylxylylene diisocyanate, and a polyamine with at least three amine groups, and where the polymerization product comprises less than 5 wt % of further isocyanate monomers in polymerized form, based on the weight of the tetramethylxylylene diisocyanate; a method for preparing the composition comprising the steps of contacting water, the pendimethalin, the tetramethylxylylene diisocyanate, and the polyamine; and to a method of controlling undesired plant growth, wherein the composition is allowed to act on the soil and/or on undesired plants and/or on the crop plants and/or on their environment.

21 Claims, No Drawings

PENDIMETHANLIN MICROCAPSULES WITH A SHELL MADE OF TETRAMETHYLXYLYLENE DIISOCYANATE AND A POLYAMINE WITH AT LEAST THREE AMINE GROUPS

This application is a National Stage application of International Application No. PCT/EP2016/062985, filed Jun. 8, 2016. This application also claims priority under 35 U.S.C. § 119 to European Patent Application No. 15172817.7, filed Jun. 19, 2015, and to European Patent Application No. 15184367.9, filed Sep. 9, 2015.

The present invention relates to a composition comprising microcapsules, which comprise a polyurea shell and a core, wherein the core comprises pendimethalin and the shell comprises a polymerization product of a tetramethylxylylene diisocyanate, and a polyamine with at least three amine groups, and where the polymerization product comprises less than 5 wt % of further isocyanate monomers in polymerized form, based on the weight of the tetramethylxylylene diisocyanate; a method for preparing the composition comprising the steps of contacting water, the pendimethalin, the tetramethylxylylene diisocyanate, and the polyamine; and to a method of controlling undesired plant growth, wherein the composition is allowed to act on the crop plants to be protected from the respective pest, on the soil and/or on undesired plants and/or on the crop plants and/or on their environment. The present invention comprises combinations of preferred features with other preferred features.

Pendimethalin is a known herbicide typically used in premergence and postemergence application to control unwanted weeds. It is also known as 3,4-dimethyl-2,6-dinitro-N-pentan-3-yl-aniline CAS No. 40487-42-1. Agrochemical formulation of pendimethalin is a unique challenge because this herbicide has a very unusual combination of properties: the melting point is low (55-57° C.), the vapor pressure is high (about 2 mPa at 25° C.), it is slowly decomposed by light, and on top it stains orange any agricultural equipment and skin which came in contact with pendimethalin. For example, suspension concentrates of pendimethalin should be carefully tank mixed with solvent based emulsion conccnectrates, because the solvent could partly dissolve the suspended particles and result in an orange spray equipment. Thus, intensive research was dedicated to this special herbicide to find a tailor made formulation overcoming these combination of problems.

Agrochemical microcapsules which comprise a polyurea shell and a pendimethalin core are known, but still need some improvement. WO 2011/095859 discloses a capsule suspension formulation of pendimethalin, which is microencapsulated in a polymeric wall and, and where the suspension comprises a second phase of alkali or alkaline earth methal salt of an organic acid. U.S. Pat. No. 8,709,975 B2 discloses an stable aqueous concentrate of 100 to 400 g/l pendimethalin microcapsules. US 2014/0200141 A1 discloses a formulation comprising microencapsulated pendimethalin and a second phase with clomazone.

The objects were solved by a composition comprising microcapsules, which comprise a polyurea shell and a core, wherein the core comprises pendimethalin and the shell comprises a polymerization product of
a) a tetramethylxylylene diisocyanate, and
b) a polyamine with at least three amine groups, and
where the polymerization product comprises less than 5 wt % of further isocyanate monomers in polymerized form, based on the weight of the tetramethylxylylene diisocyanate.

A suitable tetramethylxylylene diisocyanate may be meta- or para-substituted tetramethylxylylene diisocyanate. Preferably the tetramethylxylylene diisocyanate is the compound of formula (II)

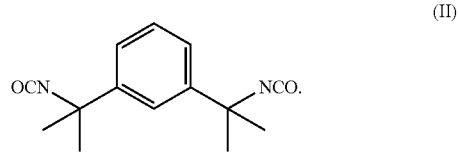

The polymerization product comprises less than 5 wt %, preferably less than 3 wt %, and in particular less than 1 wt % of further isocyanate monomers in polymerized form, based on the weight of the tetramethylxylylene diisocyanate. In another form the polymerization product is essentially free of further isocyanate monomers in polymerized form. The term "further isocyanate monomer" may refer to any compound which comprises at least one (preferably at least two) isocyanate groups, and which may be suitable as monomer for preparing poyurea.

The polyamine has at least three amine groups. Mixtures of different polyamines are also possible. Preferably, the polyamine is an aliphatic polyamine which has two primary amine groups and at least one secondary and/or tertiary amine group. Suitable polyamines are ethylene amines, which are usually commercially available from Huntsman Corp., USA or Dow Chemical Co., USA. More preferably, the polyamine is diethylenetriamine (DETA), linear or branched triethylenetetramine (TETA), N,N'-bis-(2-aminoethyl)piperazine) (Bis AEP), tetraethylenepentamine (TEPA), 4-(2-aminoethyl)-N-(2-aminoethyl)-N'-{2-{(2-aminoethyl)amino}ethyl}-1,2-ethanediamine) (AETETA), 1-(2-aminoethyl)-4-[(2-aminoethyl)amino]ethyl]-piperazine) (AEPEEDA), pentaethylenehexamine (PEHA), hexaethyleneheptamine (HEHA), or mixtures thereof. Even more preferred are triethylenetetramine (TETA), tetraethylenepentamine (TEPA), pentaethylenehexamine (PEHA), hexaethyleneheptamine (HEHA), and mixtures thereof.

In another preferred form the polyamine is a compound of formula (I)

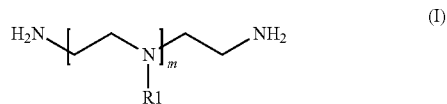

where m is an integer from 1 to 8, and R1 is H or methyl. The index m is preferably an integer from 2 to 5, more preferably from 3 to 4, and in particular 3. R1 is preferably H. Preferably, m is an integer from 2 to 5, and R1 is H.

The polyurea shell comprises usually at least 45 wt %, preferably at least 55 wt %, and in particular at least 65 wt % of the tetramethylxylylene diisocyanate. The polyurea shell comprises usually 45 to 90 wt %, preferably 55 to 85 wt %, and in particular 65 to 78 wt % of the tetramethylxylylene diisocyanate. The wt % of the tetramethylxylylene diisocyanate in the polyurea shell may refer to the total amount of monomers.

The polyurea shell comprises usually up to 55 wt %, preferably up to 45 wt %, and in up to 35 wt % of the polyamine (e.g. of the formula (I), wherein m is an integer from 1 to 8). The polyurea shell comprises usually 15 to 55 wt %, preferably 20 to 45 wt %, and in particular 25 to 35 wt % of the polyamine (e.g. of the formula (I), wherein m is an integer from 1 to 8). The wt % of polyamine in the polyurea shell may refer to the total amount of monomers.

The polymerization product may comprise up to 30 wt %, preferably up to 10 wt %, and in particular up to 5 wt % of further amine monomers in polymerized form, based on the weight of the polyamine. The term "further amine monomer" may refer to any compound which comprises at least one (preferably at least two) amine groups, and which may be suitable as monomer for preparing poyurea.

The weight ratio of the core to the polyurea shell is usually in the range from 50:1 to 5:1, preferably from 40:1 to 10:1, and in particular from 30:1 to 15:1. The weight of the core may be based on the amounts of the pendimethalin, and optionally the water immiscible organic solvent, and optionally the further solvents. The weight of the polyurea shell may be based on the amounts of the tetramethylxylylene diisocyanate and the polyamine.

In another preferred form the polyurea shell comprises 45 to 90 wt % of the tetramethylxylylene diisocyanate, 15 to 55 wt % of the polyamine (e.g. of the formula (I) wherein m is an integer from 2 to 5), less than 5 wt % further isocyanate monomers, and the weight ratio of the core to the polyurea shell is in the range from 50:1 to 5:1.

In another preferred form the polyurea shell comprises 55 to 85 wt % of the tetramethylxylylene diisocyanate, 20 to 45 wt % of the polyamine (e.g. of the formula (I) wherein m is an integer from 2 to 5), less than 3 wt % further isocyanate monomers, and the weight ratio of the core to the polyurea shell is in the range from 40:1 to 10:1.

In another preferred form the polyurea shell comprises 65 to 75 wt % of the tetramethylxylylene diisocyanate, 25 to 35 wt % of the polyamine (e.g. of the formula (I) wherein m is an integer from 2 to 5), no further isocyanate monomers, and the weight ratio of the core to the polyurea shell is in the range from 30:1 to 15:1.

Microcapsules with a polyurea shell can be prepared by analogy to prior art. They are preferably prepared by an interfacial polymerization process of a suitable polymer wall forming material, such as a diisocyanate and a diamine. Interfacial polymerization is usually performed in an aqueous oil-in-water emulsion or suspension of the core material containing dissolved therein at least one part of the polymer wall forming material. During the polymerization, the polymer segregates from the core material to the boundary surface between the core material and water thereby forming the wall of the microcapsule. Thereby an aqueous suspension of the microcapsule material is obtainable. Suitable methods for interfacial polymerization processes for preparing microcapsules containing pendimethalin have been disclosed in prior art. In general, polyurea is formed by reacting at least one diisocyanate with at least one diamine to form a polyurea shell.

The average size of the microcapsules (z-average by means of light scattering; preferably a $D_{4,3}$ average) is 0.5 to 50 μm, preferably 0.5 to 20 μm, more preferably 1 to 15 μm, and especially 2 to 10 μm.

The core of the microcapsules may comprise a water immiscible organic solvent. Suitable examples for water immiscible organic solvents are a hydrocarbon solvent such a an aliphatic, cyclic and aromatic hydrocarbons (e. g. toluene, xylene, paraffin, tetrahydronaphthalene, alkylated naphthalenes or their derivatives, mineral oil fractions of medium to high boiling point (such as kerosene, diesel oil, coal tar oils));

a vegetable oil such as corn oil, rapeseed oil;

a fatty acid ester such as $C_1$-$C_{10}$-alkylester of a $C_{10}$-$C_{22}$-fatty acid; or methyl- or ethyl esters of vegetable oils such as rapeseed oil methyl ester or corn oil methyl ester.

Mixtures of aforementioned water immiscible organic solvents are also possible. The water immiscible organic solvent is usually commerically available, such as the hydrocarbons under the tradenames Solvesso® 200, Aromatic® 200, or Caromax® 28. The aromatic hydrocarbons may be used as naphthalene depleted qualities. Preferred water immiscible organic solvents are hydrocarbons, in particular aromatic hydrocarbons.

Preferably, the water immiscible organic solvent has a solubility in water of up to 20 g/l at 20° C., more preferably of up to 5 g/l and in particular of up to 0.5 g/l.

Usually, the water immiscible organic solvent has a boiling point above 100° C., preferably above 150° C., and in particular above 180° C.

In a preferred form the core of the microcapsule may comprise up to 10 wt %, preferably up to 5 wt %, and in particular up to 1 wt % of the water immiscible organic solvent.

In a more preferred form the core of the microcapsule may comprise less than 1 wt %, preferably less than 0.5 wt %, and in particular less than 0.1 wt % of the water immiscible organic solvent. In another more preferred form the core of the microcapsule is free of the water immiscible organic solvent.

The core of the microcapsules may comprise further solvents, e.g. up to 30 wt %, preferably up to 15 wt %, based on the total amount of all solvents in the core. In another preferred form the core of the microcapsule is free of the further solvent. Further solvents may be water or water miscible solvents. The water miscible organic solvent may have a solubility in water at least 0.5 g/l at 20° C., more preferably of at least 5 g/l and in particular of at least 20 g/l In a more preferred form the core of the microcapsule may comprise less than 1 wt %, preferably less than 0.5 wt %, and in particular less than 0.1 wt % of an organic solvent. In another more preferred form the core of the microcapsule is free of the organic solvent. Suitable organic solvents are the water immiscible organic solvent and the further solvent.

The core of the microcapsule may comprise at least 90 wt %, preferably at least 95 wt %, and in particular at least 99 wt % of the sum of the pendimethalin, optionally the water-immiscible organic solvent, and optionally the further solvent. In another form the core of the microcapsule may consist of the pendimethalin, optionally the water-immiscible organic solvent, and optionally the further solvent. In yet another form the core of the microcapsule may consist of the pendimethalin.

In a preferred form the core of the microcapsule may comprise at least 90 wt %, preferably at least 95 wt %, and in particular at least 99 wt % of the pendimethalin.

The composition may be an aqueous composition, which may comprise an aqueous phase (e.g. a continuous aqueous phase). The aqueuous composition may comprise at least 10 wt %, preferably at least 25 wt %, and in particular at least 35 wt % water. Usually, the microcapsules are suspended in the aqueous phase of the aqueous compositon.

Preferably, the composition is an aqueous composition and the aqueous phase comprises a lignosulfonate. Lignosulfonates which are suitable are the alkali metal salts and/or alkaline earth metal salts and/or ammonium salts, for example the ammonium, sodium, potassium, calcium or magnesium salts of lignosulfonic acid. The sodium, potassium and/or calcium salts are very particularly preferably used. Naturally, the term lignosulfonates also encompasses mixed salts of different ions, such as potassium/sodium lignosulfonate, potassium/calcium lignosulfonate and the like, in particular sodium/calcium lignosulfonate.

The lignosulfonate may be based on kraft lignins. Kraft lignins are obtained in a pulping process of lignins with sodium hydroxyde and sodium sulfide. The kraft lignins may be sulfonated to obtain the lignosulfonate.

The molecular mass of the lignosulfonate may vary from 500 to 20000 g/mol. Preferably, the lignosulfonate has a molecular weight of 700 to 10000 g/mol, more preferably from 900 to 7000 g/mol, and in particular from 1000 to 5000 g/mol.

The lignosulfonate is usually soluble in water (e.g. at 20° C.), e.g. at least 5 wt %, preferably at least 10 wt %, and in particular at least 20 wt %.

The aqueous composition comprises usually 0.1 to 5.0 wt %, preferably 0.3 to 3.0 wt %, and in particular 0.5 to 2.0 wt % of the lignosulfonate.

The composition (e.g. the aqueous compositon) contains usually at least 1 wt % encapsulated pendimethalin, preferably at least 3 wt % and in particular at least 10 wt %.

The composition may comprise a non-encapsulated pesticide in addition to the encapsulated pendimethalin. This non-encapsulated pesticide may be present in dissolved form, or as a suspension, emulsion or suspoemulsion. It may be identical or different to the pesticide in the core. The aqueous composition may comprise the non-encapsulated pesticide in the aqous phase.

The aqueous composition contains usually at least 1 wt % non-encapsulated pesticide, preferably at least 3 wt % and in particular at least 10 wt %.

The term pesticide usually refers to at least one active substance selected from the group of the fungicides, insecticides, nematicides, herbicides, safeners, biopesticides and/or growth regulators. Preferred pesticides are fungicides, insecticides, herbicides and growth regulators. Especially preferred pesticides are herbicides. Mixtures of pesticides of two or more of the abovementioned classes may also be used. The skilled worker is familiar with such pesticides, which can be found, for example, in the Pesticide Manual, 16th Ed. (2013), The British Crop Protection Council, London. Suitable insecticides are insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, METI acarizides, and insecticides such as chloropicrin, pymetrozin, flonicamid, clofentezin, hexythiazox, etoxazole, diafenthiuron, propargite, tetradifon, chlorfenapyr, DNOC, buprofezine, cyromazine, amitraz, hydramethylnon, acequinocyl, fluacrypyrim, rotenone, or their derivatives. Suitable fungicides are fungicides from the classes of dinitroanilines, allylamines, anilinopyrimidines, antibiotics, aromatic hydrocarbons, benzenesulfonamides, benzimidazoles, benzisothiazoles, benzophenones, benzothiadiazoles, benzotriazines, benzyl carbamates, carbamates, carboxamides, carboxylic acid diamides, chloronitriles cyanoacetamide oximes, cyanoimidazoles, cyclopropanecarboxamides, dicarboximides, dihydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, methoxyacrylates, methoxycarbamates, morpholines, N-phenylcarbamates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles. Suitable herbicides are herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenol, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils, ureas.

The composition may also contain a water-soluble inorganic salt, which may result from the preparation of the microencapsules or which may be added thereafter. If present, the concentration of the water-soluble, inorganic salt may vary from 1 to 200 g/l, preferably from 2 to 150 g/l and especially from 10 to 130 g/l. Water-solubility of the salt means solubility in water of at least 50 g/l, in particular at least 100 g/l or even at least 200 g/l at 20° C.

Such inorganic salts are preferably selected from sulfates, chlorides, nitrates, mono and dihydrogen phosphates of alkali metals, the sulfates, chlorides, nitrates, mono and dihydrogen phosphates of ammonia, chlorides and nitrates of alkaline earth metals and magnesium sulfate. Examples include lithium chloride, sodium chloride, potassium chloride, lithium nitrate, sodium nitrate, potassium nitrate, lithium sulfate, sodium sulfate, potassium sulfate, sodium monohydrogen phosphate, potassium monohydrogen phosphate, sodium dihydrogen phosphate, potassium dihydrogen phosphate, magnesium chloride, calcium chloride, magnesium nitrate, calcium nitrate, magnesium sulfate, ammonium chloride, ammonium sulfate, ammonium monohydrogen phosphate, ammonium dihydrogen phosphate and the like. Preferred inorganic salts are sodium chloride, potassium chloride, calcium chloride, ammonium sulfate and magnesium sulfate with ammonium sulfate and magnesium sulfate being especially preferred.

In another embodiment, the composition does not contain or contains less than 10 g/l in particular less than 1 g/l of the water-soluble inorganic salt.

The composition may comprise an glycol, such as ethylene glycol, propylene glycol. The composition may comprise from 1 to 250 g/l, preferably from 10 to 150 g/l and especially from 30 to 100 g/l of the glycol.

The composition may comprise further auxiliaries outside the microcapsules, e.g. in the aqueous phase of the aqueous composition. Examples for suitable auxiliaries are surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-foaming agents, colorants, tackifiers and binders.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates. The term sulfonates refers to compounds which are different from the ligninsulfonates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a negligible or even no pesticidal activity themselves, and which improve the biological performance of the compound I on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-foaming agents are silicones, long chain alcohols, and salts of fatty acids.

The present invention also relates to a method for preparing the composition comprising the steps of contacting water, pendimethalin, the tetramethylxylylene diisocyanate, and the polyamine. The contacting may be done by mixing the components, e.g. at temperatures from 20 to 100° C.

The present invention furthermore relates to a method of controlling undesired plant growth, wherein the composition according to the invention is allowed to act on the soil and/or on undesired plants and/or on the crop plants and/or on their environment.

Examples of suitable crop plants are cereals, for example wheat, rye, barley, triticale, oats or rice; beet, for example sugar or fodder beet; pome fruit, stone fruit and soft fruit, for example apples, pears, plums, peaches, almonds, cherries, strawberries, raspberries, currants or gooseberries; legumes, for example beans, lentils, peas, lucerne or soybeans; oil crops, for example oilseed rape, mustard, olives, sunflowers, coconut, cacao, castor beans, oil palm, peanuts or soybeans; cucurbits, for example pumpkins/squash, cucumbers or melons; fiber crops, for example cotton, flax, hemp or jute; citrus fruit, for example oranges, lemons, grapefruit or tangerines; vegetable plants, for example spinach, lettuce, asparagus, cabbages, carrots, onions, tomatoes, potatoes, pumpkin/squash or capsicums; plants of the laurel family, for example avocados, cinnamon or camphor; energy crops and industrial feedstock crops, for example maize, soybeans, wheat, oilseed rape, sugar cane or oil palm; maize; tobacco; nuts; coffee; tea; bananas; wine (dessert grapes and grapes for vinification); hops; grass, for example turf; sweetleaf (*Stevia rebaudania*); rubber plants and forest plants, for example flowers, shrubs, deciduous trees and coniferous trees, and propagation material, for example seeds, and harvested produce of these plants.

The term crop plants also includes those plants which have been modified by breeding, mutagenesis or recombinant methods, including the biotechnological agricultural products which are on the market or in the process of being developed. Genetically modified plants are plants whose genetic material has been modified in a manner which does not occur under natural conditions by hybridizing, mutations or natural recombination (i.e. recombination of the genetic material). Here, one or more genes will, as a rule, be integrated into the genetic material of the plant in order to improve the plant's properties. Such recombinant modifications also comprise posttranslational modifications of proteins, oligo- or polypeptides, for example by means of glycosylation or binding polymers such as, for example, prenylated, acetylated or farnesylated residues or PEG residues.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

Various types of oils, wetters, adjuvants, fertilizer, or micronutrients, and further pesticides (e.g. herbicides, insecticides, fungicides, growth regulators, safeners) may be added to the agrochemical compositions comprising them as premix or, if appropriate not until immediately prior to use (tank mix). These agents can be admixed with the compositions according to the invention in a weight ratio of 1:100 to 100:1, preferably 1:10 to 10:1.

When employed in plant protection, the amounts of active substances applied are, depending on the kind of effect desired, from 0.001 to 2 kg per ha, preferably from 0.005 to 2 kg per ha, more preferably from 0.05 to 0.9 kg per ha, in particular from 0.1 to 0.75 kg per ha. In treatment of plant propagation materials such as seeds, e. g. by dusting, coating or drenching seed, amounts of active substance of from 0.1 to 1000 g, preferably from 1 to 1000 g, more preferably from 1 to 100 g and most preferably from 5 to 100 g, per 100 kilogram of plant propagation material (preferably seed) are generally required.

The present invention has various advantages: The composition is stable during storage for a long time, for example even at a wide temperature range; the composition may be applied after dilution with water without clogging the spray nozzles; the composition is stable after dilution with water; the composition may be mixed with various other crop protection products; there is a reduced staining of the equipment, the farmers, or the crop caused by coloured pendimethalin;

the volatility of the pendimethalin is reduced; the UV sensitivity is reduced; the pendimethalin is more stable after application to the crop.

The examples below give further illustration of the invention, which is not, however, restricted to these examples.

EXAMPLES

TMXDI: Tetramethyl-m-xylylene diisocyanate, CAS 2778-42-9.
TEPA: Tetraethylenepentaamine
Additive A: Sodium salt of naphthalene sulfonate condensate.
Lignosulfonate: Sodium salt of lignosulfonate, based on Kraft lignin, molecular weight about 3000 g/mol, water-soluble, CAS 68512-34-5.

Example 1

The oil phase comprising the pesticide and TMXDI was added at 65° C. to the water phase (comprising Lignosulfonate, magnesium sulfate heptahydrate) and emulsified using high-shear equipment. After emulsification, the emulsification device was replaced by a low shear stirrer and the tetraethylenepentaamine (TEPA) was added. Subsequently, the dispersion was smoothly agitated for 30-60 minutes at 60° C. Under stirring the aqueous finish solution comprising Additive A, xanthan gum, a silicon defoamer, and a biocide was added to the capsule dispersion and the pH adjusted to pH 6-8 by addition of acetic acid. The average size of the microcapsules was 7.4 μm.

TABLE 1

| | Amount [g/l] |
|---|---|
| Pendimethalin | 455 |
| TMXDI | 14.7 |
| TEPA | 5.92 |
| Lignosulfonate | 11 |
| Additive A | 4 |
| Magnesium sulfate | 100 |
| Xanthan gum | 0.4 |

TABLE 1-continued

| | Amount [g/l] |
|---|---|
| Silicon defoamer | 0.6 |
| Biocide | 2 |
| Water | Ad 1.0 l |

Example 2

The microcapsules were prepared as in Example 1. The amounts of the components are listed in Table 2. The average size of the microcapsules was 8.0 μm.

TABLE 2

| | Amount [g/l] |
|---|---|
| Pendimethalin | 455 |
| TMXDI | 14.7 |
| TEPA | 5.92 |
| Lignosulfonate | 11 |
| Additive A | 5 |
| 1,2 propylene glycol | 70 |
| Xanthan gum | 2.5 |
| Silicon defoamer | 5 |
| Biocide | 2 |
| Water | Ad 1.0 l |

Example 3

The clogging and staining test was used to investigate whether the microcapsule formulation following dilution with water to a sprayable concentration, can be used in standard sprayers without clogging the filters and staining of the spraying machine or the spraying nozzles.

A comparative Example Comp-1 was prepared according to Example 1, but instead of 5.92 g TEPA (tetraethylenepentaamine) 5.8 g hexamethylene diamine was used.

The formulation of Example 1 or the comparative Example Comp-1 was diluted with hard water (CIPAC D) to prepare 1000 ml of a microcapsule suspension containing 1 wt % of the formulation of Example 1 the comparative Example Comp-1. This microcapsule suspension was cycled for 8 h through a cartridge with a metal sieve (150 μm). During the test, the temperature was kept constant at about 10° C. in order to simulate cold well water.

Afterwards the metal sieve was visually inspected for residues. When using the Example 1 only minor residue were found. When using the comparative Example Comp-1 clearly large amounts of an orange sticky residue clogged and stained the filter already after 2 h. The test could not be continued and the equipment had to be cleaned.

The invention claimed is:
1. A composition comprising microcapsules, which comprise a polyurea shell and a core, wherein the core comprises pendimethalin and the shell comprises a polymerization product of
   a) a tetramethylxylylene diisocyanate, and
   b) a polyamine with at least three amine groups, and wherein:
   the polymerization product comprises less than 5 wt % of further isocyanate monomers in polymerized form, based on the weight of the tetramethylxylylene diisocyanate;

the polyamine is a compound of formula (I)

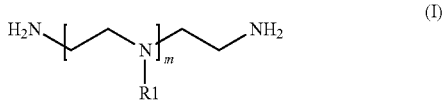

where m is an integer from 1 to 8, and R1 is H or methyl; and the pendimethalin is present in the core in an amount of at least 90 wt % relative to the core.

2. The composition of claim 1, wherein the polymerization product is essentially free of further isocyanate monomers in polymerized form.

3. The composition claim 1, wherein m is an integer from 2 to 5, and R1 is H.

4. The composition of claim 1, wherein the tetramethylxylylene diisocyanate is a compound of formula (II)

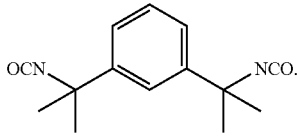

5. The composition of claim 1, wherein the weight ratio of the core to the polyurea shell is in the range from 50:1 to 5:1.

6. The composition of claim 1, wherein the molar ratio of the tetramethylxylylene diisocyanate to the polyamine is in the range from 0.8:1 to 1:1.5.

7. The composition of claim 1, wherein the polyurea shell comprises at least 55 wt % of the tetramethylxylylene diisocyanate.

8. The composition of claim 1, wherein the polyurea shell comprises up to 45 wt % of the polyamine.

9. The composition of claim 1, wherein the composition is an aqueous composition and the aqueous phase comprises a lignosulfonate.

10. The composition of claim 1, wherein the lignosulfonate has a molecular weight of up to 10000 g/mol.

11. The composition of claim 1, wherein the composition comprises 0.3 to 3.0 wt % of the lignosulfonate.

12. The composition of claim 1, wherein the core comprises less than 1 wt % of a water immiscible organic solvent.

13. The composition of claim 1, wherein the core comprises less than 0.5 wt % of a water immiscible organic solvent.

14. A method for preparing the composition of claim 1 comprising the steps of contacting water, the pendimethalin, the tetramethylxylylene diisocyanate, and the polyamine.

15. A method of controlling undesired plant growth, wherein the composition of claim 1 is allowed to act on the soil and/or on undesired plants and/or on the crop plants and/or on their environment.

16. The composition of claim 1, wherein the pendimethalin is present in the core in an amount of at least 95 wt % relative to the core.

17. The composition of claim 1, wherein:
the weight ratio of the core to the polyurea shell is in the range from 50:1 to 5:1
the polyurea shell comprises at least 55 wt % of the tetramethylxylylene diisocyanate; and
the molar ratio of the tetramethylxylylene diisocyanate to the polyamine is in the range from 0.8:1 to 1:1.5.

18. The composition of claim 17, wherein:
the pendimethalin is present in the core in an amount of at least 95 wt % relative to the core; and
the tetramethylxylylene diisocyanate is a compound of formula (II)

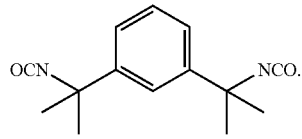

19. The composition of claim 1, wherein the pendimethalin is present in the core in an amount of at least 99 wt % relative to the core.

20. The composition of claim 1, wherein the core of the microcapsule comprises at least 99 wt. % of the sum of the pendimethalin, any optional water-immiscible organic solvent present, and any optional further solvent present, relative to the core.

21. The composition of claim 1, wherein the core of the microcapsule consists of the pendimethalin, any optional water-immiscible organic solvent present in the core, and any optional further solvent present in the core.

* * * * *